Dec. 18, 1928.
F. CATANZARITE
1,695,994
CUTTER GUARD CONSTRUCTION
Filed Dec. 23, 1927
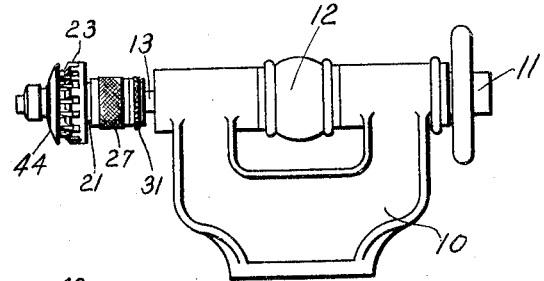
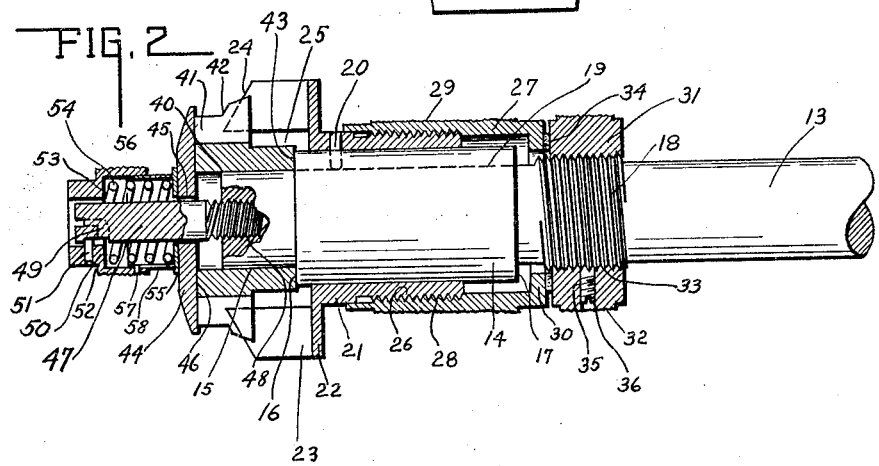
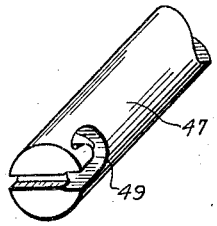
INVENTOR.
FRANK CATANZARITE.
BY
ATTORNEYS.

Patented Dec. 18, 1928.

1,695,994

UNITED STATES PATENT OFFICE.

FRANK CATANZARITE, OF DANVILLE, INDIANA.

CUTTER-GUARD CONSTRUCTION.

Application filed December 23, 1927. Serial No. 242,146.

This invention relates to a cutter and guard construction for shoe machinery.

The chief object of this invention is to permit of quick adjustment between a relatively adjustable guard and cutter construction, and a second object of the invention is to permit of quick removal and replacement of cutters if and when desired.

The chief feature of the invention consists in the means for accomplishing the foregoing objects, which to obtain relatively quick adjustment between the cutter and the guard, is associated with the guard, and which to obtain quick replacement of the cutter, is associated with the cutter and the support therefor.

The full nature of the invention will be understood from the accompanying drawings and the following description and claims:

In the drawings Fig. 1 is an elevational view of a portion of a machine with the invention mounted in operative relation thereon. Fig. 2 is a central sectional view of the invention including cutter, guard and the associated parts. Fig. 3 is an enlarged perspective view of the cutter locking portion of the spindle.

In the drawings 10 indicates a suitable frame supporting a shaft 11 carrying a driving pulley 12 and supported in the frame by the shaft and suitably connected thereto, is a driving and supporting spindle 13, the subject of this invention. Machines of the aforesaid type are employed in shoe making and repairing and are used for trimming and finishing the edges of soles and heels.

The spindle 13 has an enlarged portion 14 adjacent the cutter supporting end providing a reduced free end 15 and a shoulder 16 immediately adjacent thereto and an opposite shoulder 17. Adjacent the shoulder 17 is a threaded portion 18. The enlarged collar portion 14 is provided with a longitudinal key way 19. Longitudinally slidable on said collar portion by reason of the key 20 being seatable in said keyway, is a guard-supporting sleeve 21 which includes a peripheral base flange 22 from which radially project the guard blades 23. The guard teeth, as will be observed from Fig. 1, are triangular in cross section and include a tapered edge or face 24, all of the edges 24 being included in the same conical surface. The teeth 23 are in spaced relation from the spindle or shaft 13 and this annular space is indicated by the numeral 25 in Fig. 2.

The body portion 21 of the guard-supporting sleeve is externally threaded as at 26 and a sleeve 27 is internaly threaded as at 28. The sleeve 27 has a knurled periphery 29 for gripping engagement and sleeve 27 includes an inwardly extending collar portion 30. Said collar portion 30 is adapted to bear against the shoulder 17 when the collar portion is threaded forwardly to its outermost position. A locking collar 31 having a knurled periphery 32 is interiorly threaded as at 33 for association with the threaded portion 18 of the spindle and interposed between the collar portion 30 of the locking sleeve or collar 32 is a washer of fibre or the like 34. From the foregoing it will be apparent that rotating sleeve 27 will move the guard teeth 23 towards and away from the end of the spindle 13 without rotating said teeth. To lock the adjusting sleeve 27 in the adjusted position the locking collar 31 is threaded up so that it bears upon washer 34 which in turn bears upon the collar 30 of the adjusting sleeve and since the fibre washer is employed sufficient frictional contact is obtained between the two sleeves. To maintain the locking sleeve in predetermined position the same is provided with a radially threaded portion or opening 35 which receives a headless set screw 36 adapted to lock the locking sleeve in the clamping position with relation to the adjusting sleeve 27.

The cutter includes a cylindrical body portion 40 provided with radially projecting teeth 41 under cut, suitably relieved and provided with a suitable cutting edge or face 42, as is customary in the shoe machinery art. The spacing between the radially projecting teeth is such that the guard teeth 23 are adapted to feed into and out of the same longitudinally. The sleeve 40 has a face 43 that bears against the shoulder 16 of the collar portion 14. To drive the cutter by and with the spindle a guard disk or plate 44 having the central opening 45 is provided which bears against the opposite end 46 of the cutter sleeve. An extension 47 of reduced diameter of the spindle 13 is provided and herein the same is shown as a bolt threadedly connected thereto as at 48 and the extension projects through the opening 45 in the clamping guard disk. To clampingly mount the cutter sleeve on the spindle, means is associated with the projecting end or extension 47 which bears upon the opposite face of the guard disk.

The retaining mechanism includes a quick detachable connection in the form of a bayonet slot 49 see Fig. 3 formed near the end of the extension 47 and a collar portion or nut 50 supports a pin 51 which is receivable by the bayonet slot for locking with a quick detachable connection the securing means upon the extension 47. Herein the body portion 50 is recessed as at 52 forming a radial wall 53 against which bears one end of a coil spring 54, the other end of which bears against a radial flange 55 of a sleeve 56 receivable by or telescopically associated with the recessed portion of the body 50. A pin and slot connection 57 and 58, respectively, and herein shown formed in the body portion 50 and sleeve 56, respectively, normally limits the separating movement of the body portion 50 and the sleeve 56 but permits relative longitudinal movement therebetween. The radial flange or face 55 is adapted to bear upon the clamping guard disk 44 and maintain the same and the cutting sleeve with the cutting teeth thereon in clamped and driving relation upon the driving spindle 13. It will be apparent from Fig. 3 that the bayonet slot includes a lateral extension which extends parallel to and towards the entrance portion of the slot and thus the spring 54 is adapted to lock the pin 51 in the pocket at the end of the bayonet slot. To remove the cutter and replace the same with another merely requires compression of spring 54 by moving the body portion 50 toward the guard disk, then rotating the former relative to the extension 47 and then permitting the pin 51 to pass out of the slot to remove the clamping and maintaining means associated with the guard disk. The disk and cutter may then be removed, a new cutter provided or the old cutter replaced after resharpening, if desired or required, and then the maintaining means again secured to the extension 47 of the driving spindle 13 for clampingly maintaining the guard disk and cutter in driving engagement upon the driving spindle.

In addition to the clamping feature obtainable by the telescopically associated cap and sleeve, the same is adapted to adjust itself to the width of cutter sleeve. In instances where a threaded bolt, and herein the end is shown slotted for tool engagement, is employed the effective length of said bolt, and therefore the position of the bayonet slot, may be varied. Varying the position of the bayonet slot is a means of obtaining adjustment of the spring tension or clamping force exerted by the retaining means upon the guard disk.

The invention claimed is:

1. In combination with a rotatable driving shaft, a radially toothed guard rigid thereon for rotation therewith and a radially tooth cutter-wheel carried by the shaft for rotation, means for longitudinally adjusting the guard on said shaft and relative to the cutter, means for locking the adjusting means in the adjusted position, means for clamping the cutter to the spindle, and other means having a quickly detachable and attachable connection with said shaft for securing the clamping means in clamping relation.

2. In combination with a rotatable driving shaft, a radially toothed guard rigid thereon for rotation therewith, and a radially toothed cutter wheel carried by the shaft for rotation, a sleeve extension of the guard concentric with the shaft and having a threaded portion coaxial therewith, another sleeve arranged on said shaft and having threaded engagement with the threaded portion of the guard sleeve and including an annular clamping face, a threaded portion on said shaft, and a locking sleeve having threaded engagement with said shaft threaded portion and having clamping engagement with the clamping face of the second mentioned sleeve whereby the guard may be longitudinally adjusted on said shaft relative to the cutter and locked in the adjusted position.

3. A device as defined by claim 2 characterized by the addition of a fiber washer interposed between the clamping engageable faces of the second mentioned sleeve and the locking sleeve.

4. A device as defined by claim 2 characterized by the addition of set screw means for locking the locking sleeve in adjusted clamping position upon the shaft.

5. A device as defined by claim 2 characterized by the addition of a fiber washer interposed between the clamping engageable faces of the second mentioned sleeve and the locking sleeve, and set screw means for locking the locking sleeve in adjusted clamping position upon the shaft.

6. In combination with a rotatable driving shaft, a radially toothed guard rigid thereon for rotation therewith, and a radially toothed cutter wheel carried by the shaft for rotation, a cutter clamp disc for clamping the cutter to the shaft, said shaft projecting through the cutter and the disc, and a quickly detachable and attachable connection associated with the shaft for securing the disc in cutter clamping relation and comprising a cap receivable by the end of the shaft, a yieldingly mounted bearing member carried by said cap for exerting clamping force upon the disc, and a complementary connection between the shaft and cap comprising a pin and bayonet slot connection.

7. A device as defined by claim 6 characterized by said bayonet slot including a pin receivable pocket in the end thereof, the pin being yieldingly retained therein.

8. A device as defined by claim 6 characterized by the projecting end of the shaft comprising an axially adjustable extension for adjustably positioning the pin and slot connection toward and away from the cutter clamp for adjusting the clamping force exerted by the yieldingly mounted bearing member.

In witness whereof, I have hereunto affixed my signature.

FRANK CATANZARITE.